United States Patent
Reece

[15] 3,692,178
[45] Sept. 19, 1972

[54] FILTRATION SYSTEM
[72] Inventor: Thomas L. Reece, Portage, Mich.
[73] Assignee: Dover Corporation, New York, N.Y.
[22] Filed: June 1, 1970
[21] Appl. No.: 41,986

[52] U.S. Cl. .................. 210/82, 210/333, 210/425
[51] Int. Cl. ........................................... B01d 29/38
[58] Field of Search .......... 210/76, 82, 333, 425, 426

[56] References Cited

UNITED STATES PATENTS

| | | | |
|---|---|---|---|
| 2,301,803 | 11/1942 | Davis | 210/82 X |
| 3,029,948 | 4/1962 | McKay | 210/82 X |
| 3,056,499 | 10/1962 | Liddell | 210/82 X |
| 2,828,862 | 4/1938 | Johnson | 210/82 |
| 3,373,104 | 3/1968 | Ryan | 210/82 X |
| 3,436,260 | 4/1969 | Nuff | 210/82 X |

*Primary Examiner*—John Adee
*Attorney*—Woodhams, Blanchard and Flynn

[57] ABSTRACT

A pressure filtering method and apparatus in which the residual process liquid present in the pressure filter housing at the end of a filtration cycle is discharged from the housing, prior to the backwash cycle, and is sent to a recovery system and is treated so that it can be returned to the main stream of the process liquid.

17 Claims, 6 Drawing Figures

PRIOR ART

INVENTOR
THOMAS L. REECE
BY
Woodhams, Blanchard & Flynn
ATTORNEYS

FILTRATION SYSTEM

BACKGROUND OF THE INVENTION

This invention relates to an improved filtering method and apparatus and, more particularly, relates to a filtering method and apparatus and, more particularly, relates to a filtering method and apparatus in which the process liquid present in a filtration system at the end of a filtration cycle is salvaged, for reuse, prior to backwashing the filter.

It is well known to carry out filtration operations using filters in which the process liquid to be filtered is supplied under pressure, gravity or pump, into the space between an outer housing and an internal filter medium. The process liquid then passes through the filter medium so that solids of a size larger than the openings in the filter medium are retained on the filter medium and the resultant filtrate then flows from the filter to the system for utilizing the filtrate. It is necessary periodically to clean the filter medium to remove the contaminate build up therefrom. For this purpose, it is known to backwash the filter by flowing a backwashing liquid through the filter in the reverse direction. The backwashing liquid leaving the filter housing and the filter cake particles entrained therein are then discharged, ordinarily to a drain.

As example of a particularly difficult type of filtration operation is the filtration of heavily pigmented slurries in the paper-making industry. Such slurries include clay coating slurries, paper sizing slurries and similar particle loaded liquids. The filtration operation is intended to remove undispersed solids, paper fibers and other unwanted particles. It has been found that such slurries can be filtered most effectively by using an in-line pressure filter that is equipped with an internal vibrator which imparts high frequency low amplitude vibration to the slurry being filtered. These units provide high flow rates per unit of floor space required and there is little or no flooding, foaming and post-filter contamination. In such installations, the individual filter elements or mediums are cleaned in place by backwashing.

In the prior art backwashing procedures, the residual process liquid, including the slurry to be filtered and the resultant filtrate, present in the pressure filter housing and associated piping at the end of the filtration cycle is not removed prior to the backwashing cycle. Thus, the residual process liquid is merely mixed with the backwash-ing liquid and is discharged therewith to drain. This is undesirable for a number of reasons. For example, the process liquid in many instances is quite valuable so that a substantial economic loss occurs when the residual process liquid is mixed with the backwashing liquid and is discharged to drain. This is true, for example, of the pigmented slurries for paper-making uses as described above. Moreover, the residual process liquid in effect contaminates the backwashing liquid, which usually is water, so that the waste treatment requirements necessary prior to discharging the contaminated backwash liquid to the plant effluent system are increased.

An important factor in the design of pressure filtration systems, particularly for handling process liquids with a high solids content, such as paper coating slurries, is that the flow path for the process liquid should be smooth and uninterrupted so as to avoid the presence of pockets or dead spots where the process liquid might collect. Because of the high solids content and high viscosity of the process liquid, solids may deposit in such pockets or dead spots. Such agglomerated solids will become loosened eventually and reenter the process liquid, but since they are of larger size than the solids that flow through the filter medium, they may detrimentally affect the quality of the coated product. In particular, pockets, dead spots and the like should be avoided downstream of the filter medium. Moreover, the possibility of further contamination or dilution of, or the presence of air in, the filtered process liquid should be avoided.

Accordingly, it is an object of this invention to provide an improved filtering method and apparatus in which the residual process liquid present in a filtration system at the end of the filtration cycle is removed from the system, prior to backwashing the filter, and is recovered for reuse.

It is a further object of this invention to provide an improved filtering method and apparatus, as aforesaid, in which a separate piping and valving system is provided to segregate the residual process liquid, to be recovered, from the backwash liquid.

It is a further object of this invention to provide an improved filtering method and apparatus, as aforesaid, in which the recovered residual process liquid is subjected to a reconditioning operation so that it can be returned to the filtration system.

It is a further object of this invention to provide an improved filtering method and apparatus, as aforesaid, in which the additional conduits and valves provided from the recovery operation are located outside of the flow path of the process liquid during the filtration cycle so as to reduce the possibility of contamination of the process liquid.

Additional objects and purposes of he invention will become apparent to persons acquainted with equipment of this type upon reading the following description and inspecting the accompanying drawings.

SUMMARY OF THE INVENTION

The invention is used in conjunction with a known filtration method and apparatus including one or more filter units each having a housing and a filter medium disposed in the interior of the housing. The filter units have inlets and outlets for (1) during the filtration cycle, supplying a process liquid to the housing on one side of the filter medium and discharging the filtered process liquid from the other side of the filter medium, and (2) during the backwashing cycle, flowing a backwashing liquid in the reverse direction through the housing and filter medium in order to remove the contaminate build up from said filter medium. According to the invention, during the interval between the end of a filtration cycle and the beginning off a backwash cycle, the process liquid present in the filter unit and associated piping at the end of the filtration cycle is removed from the filter unit, usually with the assistance of a pressurized gas such as air, and is discharged into a recovery and reconditioning system. Following the removal of the residual process liquid from the filter unit, the backwashing liquid is supplied in order to clean the filter medium. The backwashing liquid and the entrained solids therein are usually discharged to a drain.

DETAILED DESCRIPTION

Since the invention can best be understood in the context of one typical prior art system with which it i intended to operate, the description will first be directed toward such a system.

Figure 1:
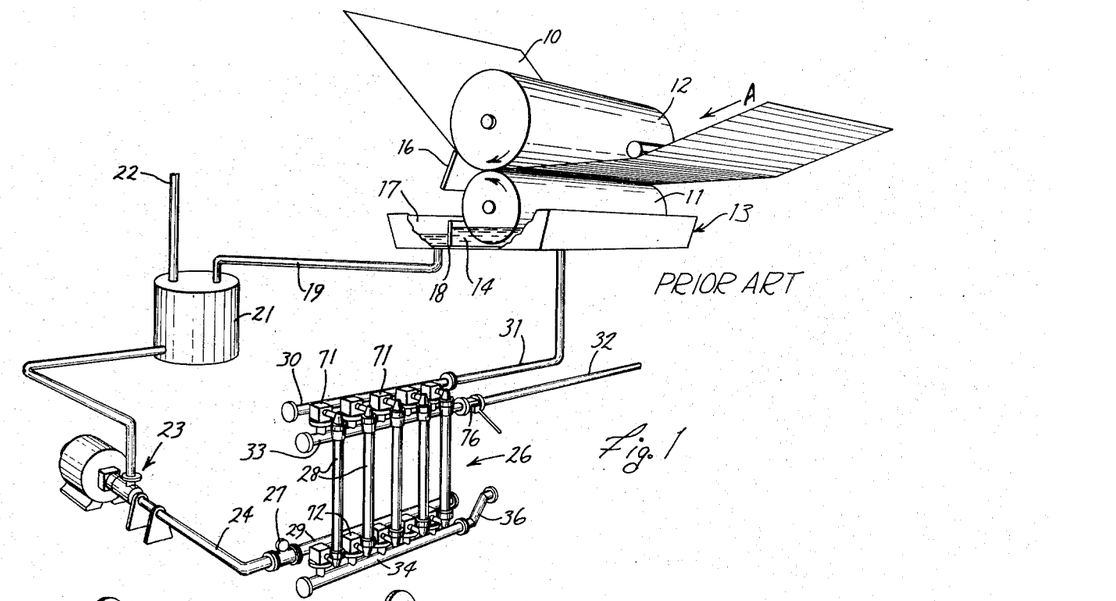
FIG. 1 is a perspective view of a typical prior art system with which can be used the filtering method and apparatus of the present invention.

Referring to the drawings, FIG. 1 illustrates a prior art system which includes a pressure filter apparatus of the type which can be modified to employ the subject mater of the present invention as described hereinbelow. It will be understood that the prior art system shown in FIG. 1 is presented, for illustrative purposes only, to indicate a typical installation with which the invention can be used to advantage. It will be further understood that the invention can be used with a wide variety of process systems employing filter units.

The system illustrated in FIG. 1 is intended for applying a coating onto a paper web 10. The web 10 continuously moves in the direction of the arrow A between an applicator roll 11 and a backing roll 12. The lower portion of the periphery of the applicator roll 11 dips into a supply of filtered coating material, i.e., a liquid slurry, in the rightward portion 14 of the pan 13. The applicator roll 11 rotates counterclockwise as shown in FIG. 1 so that it picks up coating material from the pan 13 and applies it to the underside of the paper web 10. A coater blade 16 removes excess coating material from the web 10 and said excess coating material drops into the leftward portion 17 of the pan 13. Suitable means, such as an upright wall 18, separates the portions 14 and 17 of the pan from each other so that the fresh filtered coating material in portion 14 is prevented from mixing with the scraped-off coating material in the portion 17. The coating material in portion 17 flows through a conduit 19 into the supply tank 21 for the coating material. Filtered make-up coating material is added to the supply tank 21 through the conduit 22. Coating material is withdrawn from the tank 21 by the pump 23 and is fed through the conduit 24 into the pressure filter apparatus 26. If desired, a pressure sensor 27 may be connected to the conduit 24 to provide an accurate reading of the pressure of the coating liquid.

The pressure filter apparatus 26 in the embodiment illustrated in FIG. 1 comprises five pressure filter units 28 connected in parallel. It will be understood that greater or lesser numbers of pressure filter units can be provided as needed to meet the requirements of the particular installation involved.

The coating liquid flows from the conduit 24, through the pressure sensor 27, if used, into a process liquid inlet header 29 and thence into the lower ends of the pressure filter units 28. The liquid flows upwardly through the pressure filter units and is filtered thereby in order to remove unwanted particles therefrom. The filtrate from the pressure filter units flows into a process liquid outlet header 30 and thence through a conduit 31 into the rightward portion of the pan 13 in condition for application to the web.

The respective pressure filter units 28 can be backwashed at selected intervals to remove contaminate build up therefrom. For this purpose, a conduit 32 is provided to supply a backwash liquid, such as hot water or a suitable solvent, through a valve 76 to a backwash inlet header 33. The backwash header 33 is connected to the upper ends of the pressure filter units 28 by means of valves 71 to be described in greater detail hereinbelow. Further, the lower ends of the pressure filter units 28 are connected by valves 72, also to be described in greater detail hereinbelow, to a backwash outlet header 34 which in turn is connected by conduit 36 to an effluent drain system.

Figure 3:
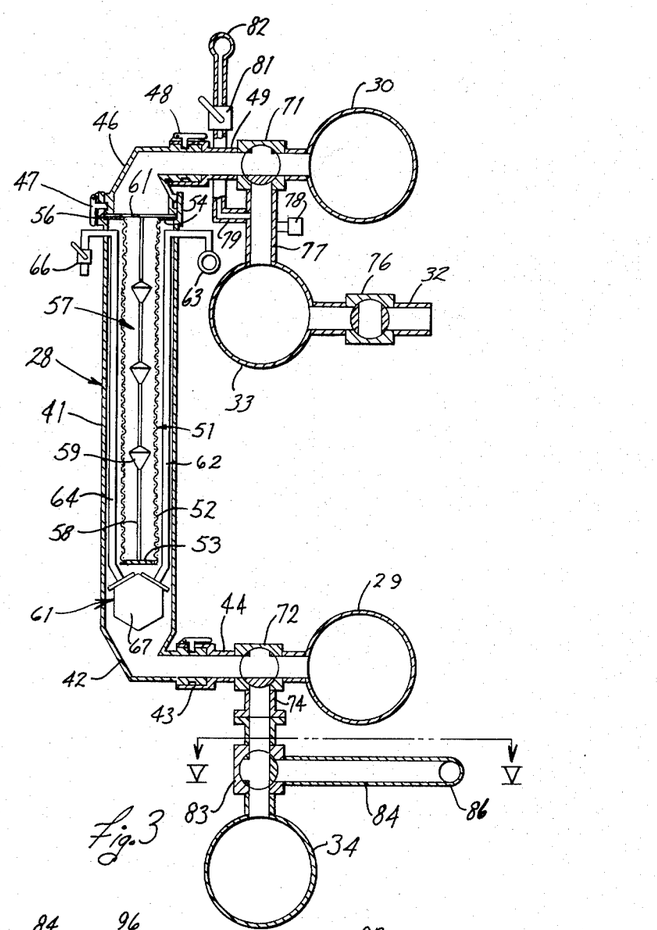
FIG. 3 is a simplified, central sectional view through a filter unit and the associated conduits used in the filtration apparatus disclosed in FIG. 2.

Referring now to FIG. 3, there is illustrated the internal structure of one of the pressure filter units 28. The pressure filter unit is comprised of a tubular outer housing or casing 41 which has an elbow 42 at its lower end connected through a suitable quick release coupling 43 to a conduit 44. The upper end of the outer casing 41 is connected to an elbow fitting 46 by another quick release coupling 47. The elbow fitting 46 in turn is connected by a further quick release coupling 48 to a conduit 49. The couplings 43, 47 and 48 are of a suitable conventional commercially available type and, preferably, are of the cam-locking quick release type, in order that the filter unit parts can be quickly separated from each other for repair or replacement purposes.

A filter element 51 is disposed within the tubular outer casing 41. The filter element 51 is comprised of a perforate filter tube 52 which is closed at its bottom end by an imperforate plate 53. The tube 52 has an annular flange 54 at its upper end. The radially outer portion of the flange 54 rests on a shoulder 56 provided adjacent the upper end of the outer casing 41. The lower end of the fitting 46 is adapted to clamp the flange 54 in position on the casing 41. The upper end of the tube 52 is open and it communicates directly with the internal passage of the fitting 46.

If desired, a diffuser structure 57 may be disposed within the tube 52 as set forth in U.S. Pat. No. 3 387 712 to ensure effective and uniform cleaning of the filter element 51 during the backwash cycle.

Likewise if desired, an air-operated vibrator assembly such as that shown in U.S. Pat. No. 3 161 591 may be disposed within the outer casing and outside the filter element. Such vibrating unit transmits a high frequency, low amplitude vibration to the process liquid in the region of the filter area and ensures a high flow and positive clarification while maintaining a uniform condition of the slurry or process liquid being filtered.

The filter tube 52 may be constructed in a wide variety of known ways. For example, the filter tube 52 can be made of a suitable reinforced metal screen or, preferably, the filter tube is comprised of a slotted metal tube. The invention is not concerned with the details of the construction of the filter tube 52 and further description thereof is believed to be unnecessary.

The upper conduit 49 is connected to a three-way valve 71 so that the conduit 49 can be connected alternatively to the backwash inlet header 33 or to the process liquid outlet header 30. Similarly, the lower conduit 44 is connected to a three-way valve 72 so that said conduit can be connected alternatively to the process liquid inlet header 29 or to a conduit 74. The valves 71 and 72 are illustrated in FIG. 3 as being in the position they occupy during the filtration cycle wherein the process liquid or slurry to be filtered flows from the inlet header 29 through the conduit 44, thence through the filter unit 28 and the upper conduit 49 to the outlet header 30. When the valves 71 and 72 are rotated counterclockwise through an angle of 90° from the positions shown in FIG. 3, they will then be positioned for carrying out the recovery and backwash cycles as will be described hereinbelow. During the recovery and backwash cycles, the process liquid inlet header 29 and outlet header 30 do not communicate with the filter unit 28.

Referring now to the structure associated with the filter unit 28 for carrying out the recovery and backwash cycles, the conduit 32 has a two-way valve 76 therein for controlling the supply of backwash liquid to the backwash header 33. It will be understood that the valve 76 will be in the closed position as shown in FIG. 3 except during the backwash cycle. The valve 76 will be rotated 90° from the position shown in FIG. 3 to its open position when it is desired to backwash one or more of the filter units 28. The backwash header 33 is common to all of the filter units 28 and it is connected to the respective filter units by means of conduits 77. An air breaker valve 78 is attached to each of the conduits 77 or, alternatively, a single air breaker valve can be mounted on the backwash inlet header 33. The air breaker valve 78 is operated after the backwash cycle for a filter unit is completed so as to place the filter unit in communication with the atmosphere whereby to permit gravity draining of the backwash liquid from the filter unit, prior to reintroducing the process liquid to be filtered during the next filtration cycle. By completely draining the backwash liquid from the filter unit prior to starting the next filtration cycle, dilution of the incoming process liquid for the next filtration cycle is avoided.

Turning now to the modifications in the prior art system embodying the present invention, the conduit 77 has a compressed gas, normally compressed air, supply line 79 connected thereto. A valve 81 is provided in the air supply line 79 and said line is connected to an air supply header 82 which is common to all the filter units. The valve 81 is closed except during the recovery cycle. During the recovery cycle, the valve 81 is opened, the valve 76 is closed and the valve 71 is rotated 90° counterclockwise from the position shown in FIG. 3 whereby pressurized gas flows through the conduits 77 and 49 and thence downwardly through the filter unit 28 in order to displace or purge from the filter unit all process liquid remaining therein at the end of the filtration cycle and prior to beginning the backwash cycle.

The connection of the compressed air line 79 to the conduit 77 is advantageous because it insures that the flow path for the process liquid during the filtration cycle does not communicate with the air line 79, so that an erroneous opening of the valve 81 during the filtration cycle will not cause air to become present in the process liquid. Also, if the air line 79 were connected to the fitting 46 or conduit 49, it is possible that solid particles might collect or agglomerate thereat and that such particles could be discharged into the process liquid, after it has been filtered. This would cause a defect in the coating on the paper web. Thus, by locating the air line 79 outside the process fluid flow path during the filtration cycle, improved results are achieved.

The process liquid discharged from the filter unit 28 by the compressed air form line 79 flows to the recovery and reconditioning system as will be described hereinbelow. Positive pressure purging of the residual process liquid in the filter unit at the end of the filtration cycle is necessary because of the high viscosity of the process liquid. Gas, normally air, is used for purging purposes in order to avoid dilution of the residual process liquid sent to the recovery and reconditioning system.

Both the recovered process liquid and the backwash liquid are discharged, at different times, from the filter unit 28 through the conduit 74. The conduit 74 has a three-way valve 83 therein for alternatively directing fluid into either the backwash outlet header 34 or into the recovery system conduit 84. The conduit 84 is kept as short as possible and is arranged either horizontally or downwardly inclined so as to facilitate flow of the process liquid to be recovered. The conduits 84 from all the pressure filter units 28 are connected to a common recovery header 86.

The valve 83 is illustrated in FIG. 3 in the position it occupies during the backwash cycle in which conduit 74 communicates with the backwash outlet header 34. During the recovery cycle, the valve 83 is rotated 90 degrees clockwise from the position illustrated in FIG. 3 in order to place conduit 74 in communication with the conduit 84. The position of the valve 83 during the filtration cycle is not important to the basic function of the apparatus because at that time it is isolated from the system by the valve 72, although for convenience in automating the control thereof it is preferable to have valve 83 positioned in the filtration step to connect conduit 74 with salvage conduit 84.

Figure 2:
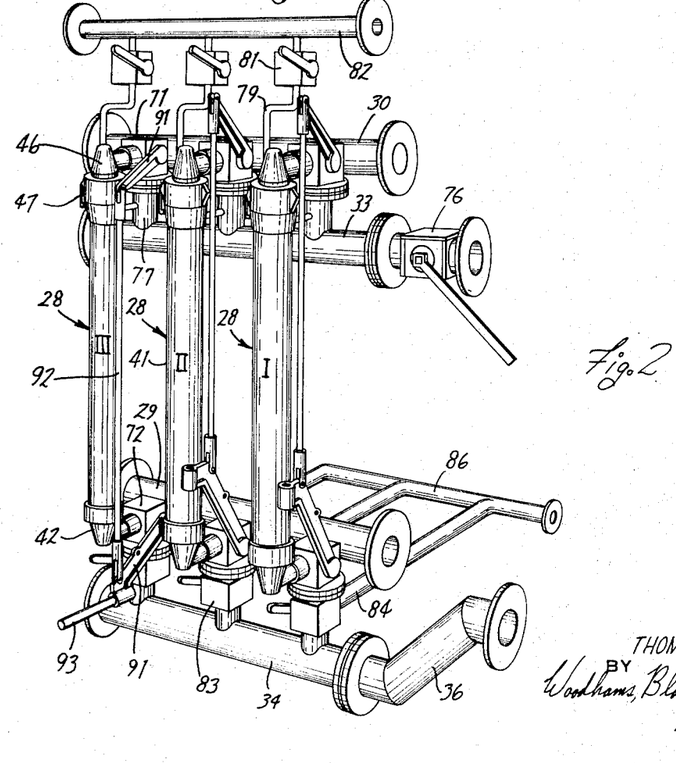
FIG. 2 is a perspective view of a filtration apparatus according to the present invention.

Referring to FIG. 2, there is illustrated a filtering assembly consisting of three pressure filter units 28 each having the associated conduits and valves as described above. It will be understood that the number of filter units 28 in a particular installation is variable depending on the requirements of the particular installation involved. For example, a single pressure filter unit can be used where intermittent operation is satisfactory and multiple pressure filter units can be used where a continuous operation is to be carried out. In a multiple filtering unit installation as illustrated in FIG. 2, each filter unit 28 operates independently of the others and it can be taken out of the system by operation of its associated valves, without affecting the operation of the other filter units. Thus, a backwash cycle for one unit can be carried out while the other filter units are still in their filtration cycles. Further, each filter unit can be quickly and easily physically removed for servicing or repair by manipulation of its associated couplings, without affecting the operation of the other filter units.

The valves 71 and 72 for each filter unit have actuating levers 91 which are coupled together, here by a rod 92, whereby both valves may be actuated simultaneously at the beginning and at the end of the filtration cycle. An actuating handle 93 is removably receivable in a socket in the lower levers 91 to effect actuation of the valves 71 and 72 for each filter unit. The valves 76, 81 and 83 are illustrated as being manually operated valves, but it will be understood that these valves could be operated by power means, e.g. fluid power or electric power, and, further, it will be understood that the entire cycle of operation of the filter apparatus could be automated by utilizing a suitable master control.

Figure 4:
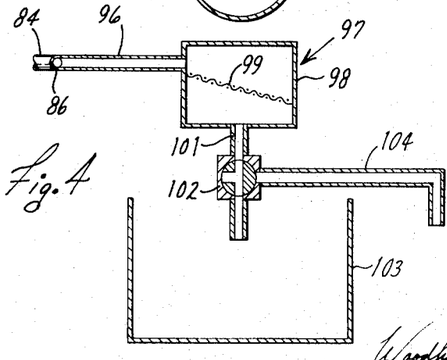
FIG. 4 a simplified sectional view showing a preferred construction of the process liquid recovery and reconditioning system.

Referring to FIG. 4, there is illustrated an apparatus for treating the residual process liquid removed from the filter units during the recovery cycle so that it can be returned to the process liquid utilization system for reuse. In this embodiment, the recovery header 86 is connected by a conduit 96 to a filter apparatus 97. The filter apparatus 97 is preferably of the gravity type and it comprises a vessel 98 having a filter medium 99, such as an inclined screen, extending across the vessel between the top and the bottom thereof so that the recovered process liquid drains by gravity through the filter medium 99. It will be understood that the filter apparatus 97 is not always essential and, further, that a variety of different filter arrangements could be used at this position, such as one employing an oscillating filter medium.

Figure 5:
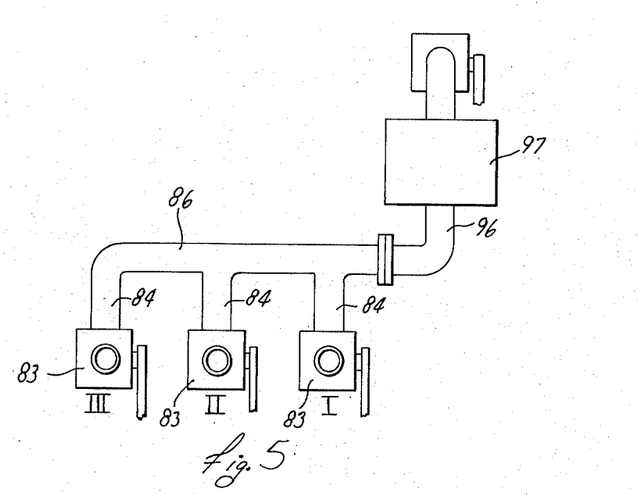
FIG. 5 is a sectional view substantially as taken along the line V—V of FIG. 3.

Referring to FIG. 5, there is illustrated a preferred arrangement of the conduits 84, recovery header 86 and conduit 96. It will be noted that conduit 96 is positioned at one end of the header 86. Further, it will be preferred to conduct the recovery and backwash cycles in the sequence of filter units I, II and III. Thus, during the recovery cycle of filter unit III the entirety of the recovery header 86 will be cleaned out so as to remove therefrom any liquid which remains present therein from the recovery operations of the previously cycled filter units I and II. Thus, the prolonged presence of process liquid in the recovery system is avoided. This is desirable particularly if the process liquid is highly viscous, in order to prevent settling of solids in the recovery system.

Referring again to FIG. 4, the vessel 98 has a conduit 101 extending downwardly from the bottom wall thereof. A three-way valve 102 is provided in the conduit 101 whereby the filtered recovered process liquid can be fed into a tank 103 or, alternatively, it can be directed through the line 104 and then to drain. During normal recovery operations, the valve 102 will be positioned as illustrated in FIG. 4 to direct the recovered process liquid into the tank 103, from whence it can be returned to the process liquid utilization system, for example, by flowing it into the conduit 22.

In some instances, particularly when the process liquid has a high solids content, it may be advisable to direct a quantity of the backwash liquid through the recovery system, from time to time, for the purpose of purging same of any process liquid present therein. It will normally be suitable to purge the recovery system at the end of the backwash cycle for the last pressure filter unit III in the particular installation involved. However this can be done more frequently, if desired, such as at the end of the backwash cycle of each pressure filter unit.

During the recovery system purging cycle, the valve 102 is rotated 90° clockwise from the position shown in FIG. 4 to discharge the liquid into the line 104 whereby it flows to drain. Discharge of the liquid during the recovery system purging cycle to drain is advisable because this process liquid will be diluted and ordinarily will be unsuitable for return to the process liquid utilization system.

MODIFICATION

Figure 6:
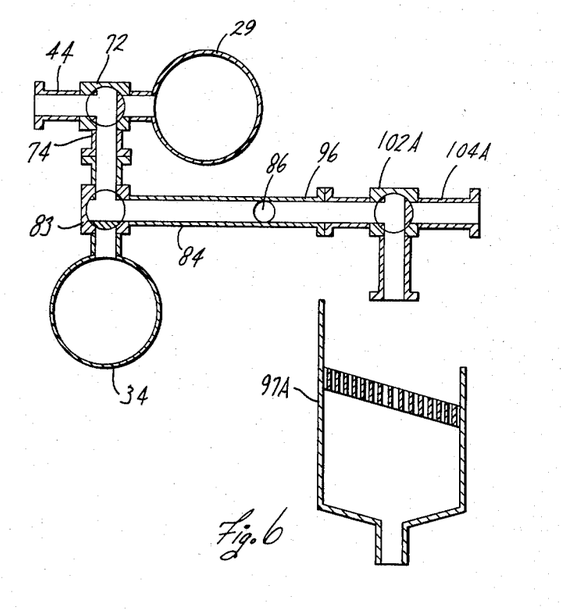
FIG. 6 is a simplified sectional view of a modified recovery and reconditioning system.

FIG. 6 illustrates a modified recovery and reconditioning system which is essentially similar to the system of FIG. 4. Corresponding parts are indicated by the same reference numbers. In this embodiment, the valve 102A and conduit 104A are positioned ahead of the filter apparatus 97A. This arrangement will be desirable, particularly when flow of the recovery system purging liquid through the screen of filter apparatus 97A is not desired.

OPERATION

Although the operation of the filtration system has been indicated above, the same will be reviewed in sequence in order to insure a clear understanding of the invention. A complete cycle of operation of only one filter unit will be described and it will be understood that the same sequence of operations will take place in all filter units. The cycling of the respective filter unit can take place at the same time or at different times in accordance with any conventional desirable operating procedure.

A. Filtration Cycle

During the filtration cycle of any individual filter unit 28, the valves 71 and 72 are positioned as shown in FIG. 3. Thus, the process liquid to be filtered flows from the process liquid inlet header 29 to the conduit 44, thence through the filter unit 28 and the upper conduit 49 to the process liquid outlet header 30. The filtrate is therefore supplied in a clarified condition to the process liquid utilization system, such as to the pan 13 in FIG. 1. This operation is conventional and is not believed to require further detailed description.

B. Recovery Cycle

At the end of the filtration cycle and prior to beginning the backwash cycle, the valve 83 is in a position such that conduit 74 is in communication with conduit 84. Then, the valves 71 and 72 are rotated 90° counterclockwise as appearing in FIG. 3 to disconnect the process liquid inlet header 29 and outlet header 30 from the conduits 44 and 49. At this time, there is present in the filter unit 28 a quantity of the process liquid undergoing filtration.

This includes, for example, a quantity of process liquid outside the tube 52 and a quantity of filtrate inside said tube. It is desired to recover the retained process liquid in a condition suitable for return to the utilization system. Possibly some flow of the retained process liquid into the recovery system may occur due to gravity, but because of the high viscosity of the process liquid, such flow will be small.

After the valves 71 and 72 have been rotated 90° counterclockwise as above described, the valve 81 is opened to direct pressurized gas, usually air, into the conduit 77 from whence it flows into the conduit 49, thence downwardly through the filter unit 28 whereby the process liquid retained in the filter unit is displaced through the conduit 44, valve 72, conduit 74, valve 83 and conduit 84 into the recovery header 86.

The use of an air-assisted discharge of the retained process liquid from the filter unit 28 insures that the process liquid, even though it is at least somewhat viscous, will be substantially completely discharged from the filter unit 28 into the recovery header 86. The recovered process liquid will then flow through the conduit 96 into the filter apparatus 97 and thence through the conduit 101 and valve 102 into the tank 103. Some of the filter cake on filter medium 52 may be loosened and flow into the recovery system. This is removed from the recovered process liquid by the screen 98.

During the recovery cycle, the valve 102 is positioned as shown in FIG. 4. Also, the valve 76 is closed as shown in FIG. 3. At the end of the recovery cycle, the air supply valve 81 is closed and the valve 83 is rotated 90° clockwise back to the position shown in FIG. 3.

C. Backwash Cycle

Then the valve 76 is opened to supply backwash liquid to the backwash header 33. The backwash liquid flows from the header 33 through the conduit 77, valve 71, conduit 49, filter unit 28, conduit 44, valve 72, conduit 74 and valve 83 to the backwash outlet header 34. The flow of the backwash liquid will flush clean the filter element 52 and the filter cake particles will be discharged into the backwash outlet header 34. Since the process liquid trapped in the filter unit at the end of the filtration cycle was previously removed during the recovery cycle, the amount of the process liquid flowing to drain during the backwash cycle will be negligible. It is usually satisfactory to flow backwash liquid through the filter unit for a period of about 10 to 15 seconds at a flow rate of about 175 to 200 gallons per minute to effect thorough cleaning of the filter element. This operation again is conventional and is not believed to require further description.

If purging of the recovery system is not required, then the following recovery system purge cycle can be omitted. However, if purging of the recovery system is to be carried out, then the following steps will be taken.

D. Recovery System Purge Cycle

The recovery system purge cycle will not be essential following each backwash cycle of each filter unit. Rather, it will ordinarily be sufficient to carry out a recovery system purge cycle only after the last one of a group of filter units in a filtration apparatus has been backwashed. However, if desired or necessary because of the requirements of a particular installation, a recovery system purge cycle can be carried out following each backwash cycle of each pressure filter unit.

In order to clean out the recovery system, after the backwash cycle is completed, the valve 83 is again rotated 90° clockwise from the position shown in FIG. 3 and the valve 102 (or 102A) is rotated 90° clockwise as appearing in FIG. 4. Thus, the backwash liquid still flowing through the filter unit 28 passes through the conduit 84, recovery header 86, conduit 96, filter 97 and valve 102 and thence to drain to thereby purge any residual process liquid from the recovery system. Such a purging cycle requires only a few seconds and as soon as it is completed, the valves 83 and 102 are actuated to restore them to the positions illustrated in FIGS. 3 and 4, respectively. It is understood that the purge water in the recovery system may be itself purged forceably by air if desirable.

E. Filter Unit Drain Cycle

Following completion of the backwash cycle and the recovery system purge cycle, if used, the valve 76 is closed and then the air breaker valve 78 is opened, whereby the backwash liquid in the conduit 49, filter unit 28, conduit 44 and conduit 74 drains by gravity into the backwash outlet header 34. As soon as this is completed, the valves 71 and 72 are then restored to their FIG. 3 positions whereupon the foregoing described filtration cycle can be repeated. Since the filter unit 28 has been drained of backwash liquid, the incoming process liquid for the next filtration cycle will not be diluted.

The operation of a filtration system employing a plurality of filter units 28 will follow the above-described procedure, although ordinarily only one filter unit will undergo recovery, backwash, purge and drain cycles at one time. The other filter units in a given filtration system will remain on stream so that the supply of filtered process liquid to the process liquid utilization system will not be interrupted.

It will be observed that the additional components of the recovery system including conduit 79, valve 83, conduits 84, etc. are located outside of the flow path of the process liquid during the filtration cycle. Thus, the provision of these components will not interfere with the smooth uninterrupted flow of the process liquid. Therefore, the provision of the recovery system will not increase the possibility of large size particles becoming present in the process liquid, particularly downstream of the filter medium 52. Further, because the components of the recovery system are not connected to the pressure filter units between the couplings 43 and 48, each filter unit 28 can be easily removed from the system for servicing and repair and without interfering with the recovery system.

The embodiments of the invention in which an exclusive property or privilege is claimed are defined as follows:

1. A filtration system comprising a housing having a filter medium disposed in the interior thereof, a first inlet for supplying a process fluid to the housing on one side of said filter medium, a first outlet for receiving filtered process fluid from the housing from the opposite side of said filter medium, a second inlet for supplying a backwashing fluid to the housing on said opposite side of said filter medium, a second outlet for receiving the backwashing fluid from said housing from said one side of said filter medium;

valve means for alternatively placing (1) said first inlet and said first outlet in communication with said housing, and (2) said second inlet and said second outlet in communication with said housing, in order to effect filtration and backwash cycles, respectively;

a recovery system associated with said second outlet for receiving process fluid present in said housing at the end of a filtration cycle and prior to a backwash cycle;

compressed gas supply means connected to said housing through a path shared by said first outlet and said second inlet and energizable after said first outlet is disconnected from said housing and prior to connection of said second inlet to said housing for forceably discharging residual process fluid from said housing.

2. A filtration system according to claim 1, wherein said first outlet includes an outlet conduit for said process fluid, said second inlet includes an inlet conduit for said backwash fluid, a discharge conduit leading from said housing, a valve connected between said discharge conduit and said process fluid outlet conduit and said backwash fluid inlet conduit for alternatively connecting same to said discharge conduit, said compressed gas supply means being connected to said backwash fluid inlet conduit and isolated from said process fluid outlet conduit by said valve.

3. A filtration system according to claim 1, including an inlet conduit for said process fluid, an outlet conduit for said backwash fluid and an entrance conduit leading from said housing, a valve connected between said entrance conduit and said process fluid inlet conduit and said backwash fluid outlet conduit for alternatively connecting same to said entrance conduit, and a further valve connected between said backwash fluid outlet conduit and said recovery system.

4. A filtration system according to claim 3, in which said recovery system contains a valve for alternatively directing fluid flowing therethrough into a filter vessel for recycling the process fluid to the filtration system or to discharge same from the filtration system.

5. A filtration system according to claim 1 including a plurality of housings each having a filter medium therein and each having a second outlet, said recovery system including a recovery header, a plurality of valves connecting corresponding ones of said second outlets to said recovery header, said recovery system further including a filter vessel and means connecting same to said recovery header for removing large particles from residual process fluid recovered from said plurality of housings prior to backwashing.

6. In a filtration system comprising a closed housing having a first conduit at one end thereof, a second conduit at the opposite end thereof, a filter medium disposed in said housing between said ends thereof, a process liquid inlet and a backwash liquid outlet and first valve means for alternatively connecting said process liquid inlet and backwash liquid outlet to said first conduit, a process liquid outlet and a backwash liquid inlet and second valve means for alternatively connecting said process liquid outlet and said backwash liquid inlet to said second conduit, the improvement comprising recovering means for forcibly removing and recovering residual process liquid from said housing following a filtration step and prior to a backwashing step, so as to avoid cross-contamination of said residual process liquid and backwashing liquid, said recovering means including a pressure gas inlet connected to said second conduit for pressurizing said housing and a recovery system connectible to said first conduit for receiving residual process liquid driven from said housing by said gas, said first valve means including a first three-way valve connected between said process liquid inlet and said backwash liquid outlet for alternately connecting same to said first conduit, said backwash liquid outlet including a discharge conduit adjacent said first valve, a second three-way valve in said discharge conduit and alternately connectible to said recovery system and a backwash liquid receiver, said second valve means comprising a third three-way valve connected between said process liquid outlet and said backwash liquid inlet for alternately connecting same to said second conduit, said pressure gas inlet comprising a compressed gas supply conduit including a valve and connected to said backwash liquid inlet, said gas supply conduit being separated from the outlet path of said process liquid by said third three-way valve, and an air breaker valve on said backwash inlet conduit adjacent said gas supply conduit openable at the end of a backwash cycle to place the filter unit in communication with the atmosphere, whereby residual process liquid remaining in the housing after a filtration step is forcibly purged from the housing and recovered for future use before backwash liquid is introduced into the housing.

7. In a filtration system comprising a closed housing having a first conduit at one end thereof, a second conduit at the opposite end thereof, a filter medium disposed in said housing between said ends thereof, a process liquid inlet and a backwash liquid outlet and first valve means for alternatively connecting said process liquid inlet and backwash liquid outlet to said first conduit, a process liquid outlet and a backwash liquid inlet and second valve means for alternatively connecting said process liquid outlet and said backwash liquid inlet to said second conduit, the improvement comprising recovering means for forcibly removing and recovering residual process liquid from said housing following a filtration step and prior to a backwashing step, so as to avoid cross-contamination of said residual process liquid and backwashing liquid, said recovering means including a pressure gas inlet connected to said second conduit for pressurizing said housing and a recovery system connectible to said first conduit for receiving residual process liquid driven from said housing by said gas, said second valve means comprising a three-way valve connected between said process liquid outlet and said backwash liquid inlet for alternatively connecting same to said second conduit, said pressure gas inlet comprising a valved compressed gas supply conduit connected to said back wash liquid inlet and separated from the outlet path of said process liquid by said three-way valve, whereby residual process liquid remaining in the housing after a filtration step is forcibly purged from the housing and recovered for future use before backwash liquid is introduced into the housing.

8. Improvement in a filtration system according to claim 7, in which said first valve means includes a second three-way valve connected between said process liquid inlet and said backwash liquid outlet for alternatively connecting same to said first conduit, said backwash liquid outlet including a discharge conduit adjacent said first valve, a third three-way valve in said discharge conduit and alternately connectible to said recovery system and a backwash liquid receiver, said recovery system having a fourth three-way valve for alternatively directing residual process liquid into a recycle vessel and to drain.

9. Improvement according to claim 8, in which the recovery system includes gravity filter means for removing large solids between said third and fourth three-way valves.

10. Improvement according to claim 8, in which the recovery system includes gravity filter means for removing large solids between said fourth three-way valve and said recycle vessel.

11. Improvement according to claim 8, in which a series of closed housings having filter mediums therein are connected in parallel, said third three-way valves for all of said housings being connected by short conduits to a common recovery header which communicates with a single fourth three-way valve.

12. Improvement according to claim 7, in which said housing is tubular and has a tubular filter element therein, a vibrating device mounted in said housing outside of said tubular filter element and releasable couplings between said housing and said first and second conduits.

13. A filtering method comprising the steps of (1) during a filtration cycle, flowing a process fluid to be filtered in a first direction through a housing having a filter medium therein in order to remove unwanted particles from the process fluid, (2) at the end of the filtration cycle, terminating flow of the process fluid by adjusting a first valve to disconnect the inlet of the housing from the supply conduit for the process fluid and connecting said inlet to a drain system, leaving free residual process fluid in the housing, (3) injecting gas under pressure into said housing in the reverse direction and forcibly driving said free residual process fluid from said housing in said reverse direction so that the housing is empty of process fluid by adjusting a second valve to disconnect the outlet of the housing from the outlet conduit for the process fluid and connecting same to an inlet conduit for said gas and backwash fluid and then by admitting said gas to said inlet conduit (4) recovering said residual process fluid for reuse by discharging said residual process fluid retained in said housing through a further valve in said drain system to a recovery system while preventing said backwash fluid from entering said inlet conduit, (5) then flowing a backwash fluid through said housing in said reverse direction in order to remove contaminate from said filter element and discharging the backwash liquid and contaminate particles entrained therein from the housing so that housing is empty of backwash fluid, and (6) then reintroducing process fluid into the housing for repeating the filtration cycle whereby contact and cross-contamination between process and backwash fluids in and adjacent the housing is substantially eliminated.

14. A filtering method according to claim 13 in which the process fluid is a slurry and the step of recovering said residual process fluid includes screening same to remove particles sized larger than solids normally in the process fluid therefrom prior to reintroducing said residual process fluid into the filtering system.

15. A filtering method according to claim 13, including the further step of flowing backwash liquid through the recovery system at selected intervals to purge process fluid therefrom and then discharging said backwash fluid from the recovery system.

16. A filtering method according to claim 13, including the step of venting said housing to the atmosphere following backwashing while draining the housing of residual backwash fluid so as to remove all backwash fluid from the housing.

17. A filtering method according to claim 16, in which the filtered process fluid is a high viscosity slurry of high solids content, the backwashing fluid is water and the gas is air.

* * * * *